United States Patent [19] [11] Patent Number: 4,829,864
Yanagisawa et al. [45] Date of Patent: May 16, 1989

[54] PLATE WORKPIECE PROCESSING MACHINE

[75] Inventors: Masayoshi Yanagisawa, Isehara; Hidekatsu Ikeda, Hatano, both of Japan

[73] Assignee: Amada Company, Limited, Japan

[21] Appl. No.: 61,284

[22] Filed: Jun. 12, 1987

[30] Foreign Application Priority Data

Jun. 13, 1986 [JP] Japan .............. 61-136282
Japan .............. 61-91227[U]
Japan .............. 61-92404[U]
Jul. 9, 1986 [JP] Japan .............. 61-104239[U]

[51] Int. Cl.[4] .............................. B23D 36/00
[52] U.S. Cl. .............................. 83/33; 83/39; 83/42; 83/72; 83/157; 83/209; 83/468
[58] Field of Search .............. 83/39, 33, 157, 209, 83/468, 73, 72, 23, 42, 71, 202

[56] References Cited

U.S. PATENT DOCUMENTS 3,260,145 7/1966 Giordano .............. 83/468 X
4,331,020 5/1982 Cros .............. 83/468 X
4,679,473 7/1987 Hirata et al. .............. 83/157

FOREIGN PATENT DOCUMENTS 0022403 1/1981 European Pat. Off. .............. 83/468

Primary Examiner—Donald R. Schran
Attorney, Agent, or Firm—Wigman & Cohen

[57] ABSTRACT

A process a plate workpiece with high precision at high speed, the plate processing machine comprises a workpiece side surface positioning device (SPD) provided with magnet rollers (MR); a workpiece trimming device (TD) provided with a tool actuating switch (SW); and a workpiece positioning device (PD) provided with an optical sensor (SE). The magnet rollers guide a workpiece forward in magnetic rotatable contact engagement with the side surface of the workpiece. The tool actuating switch is actuated before the workpiece is located at a trimming position for automatic trimming operation. The optical sensor generates a feed speed deceleration signal so that a fed workpiece will not apply shock to the stop member of the positioning device by adjusting the sensor position relative to the stop surface according to the workpiece length to be cut.

12 Claims, 10 Drawing Sheets

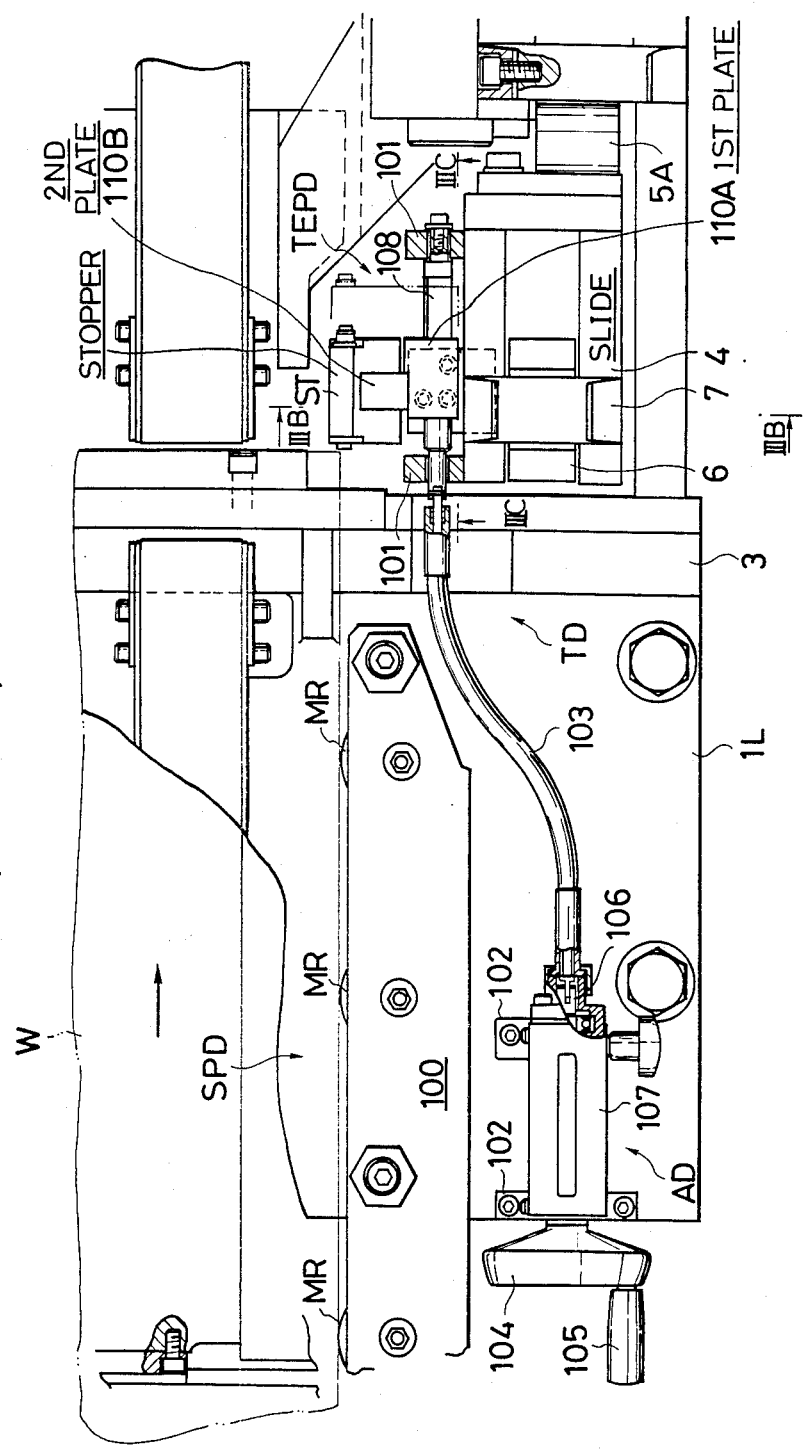
FIG.2 (TOP VIEW)

(FRONT VIEW)

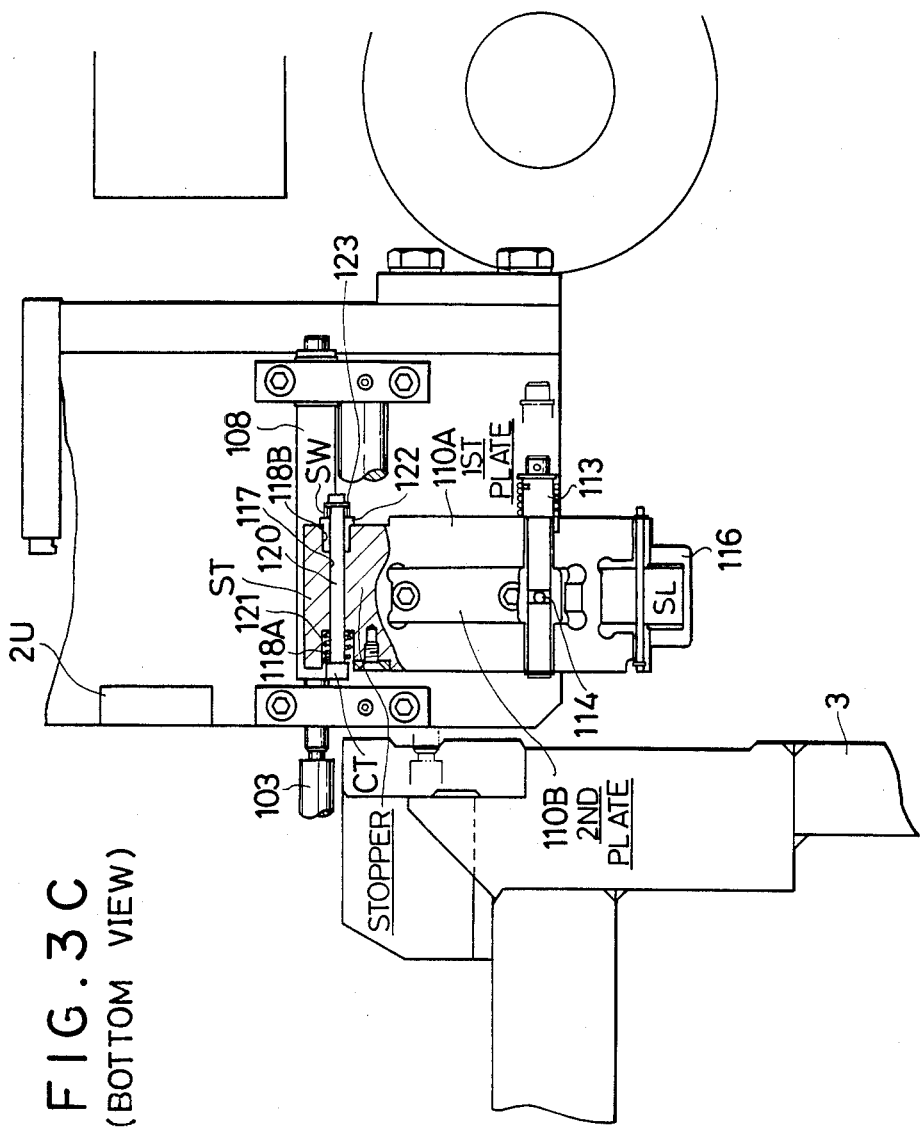
FIG. 3C (BOTTOM VIEW)

(TOP VIEW)

(SIDE VIEW)

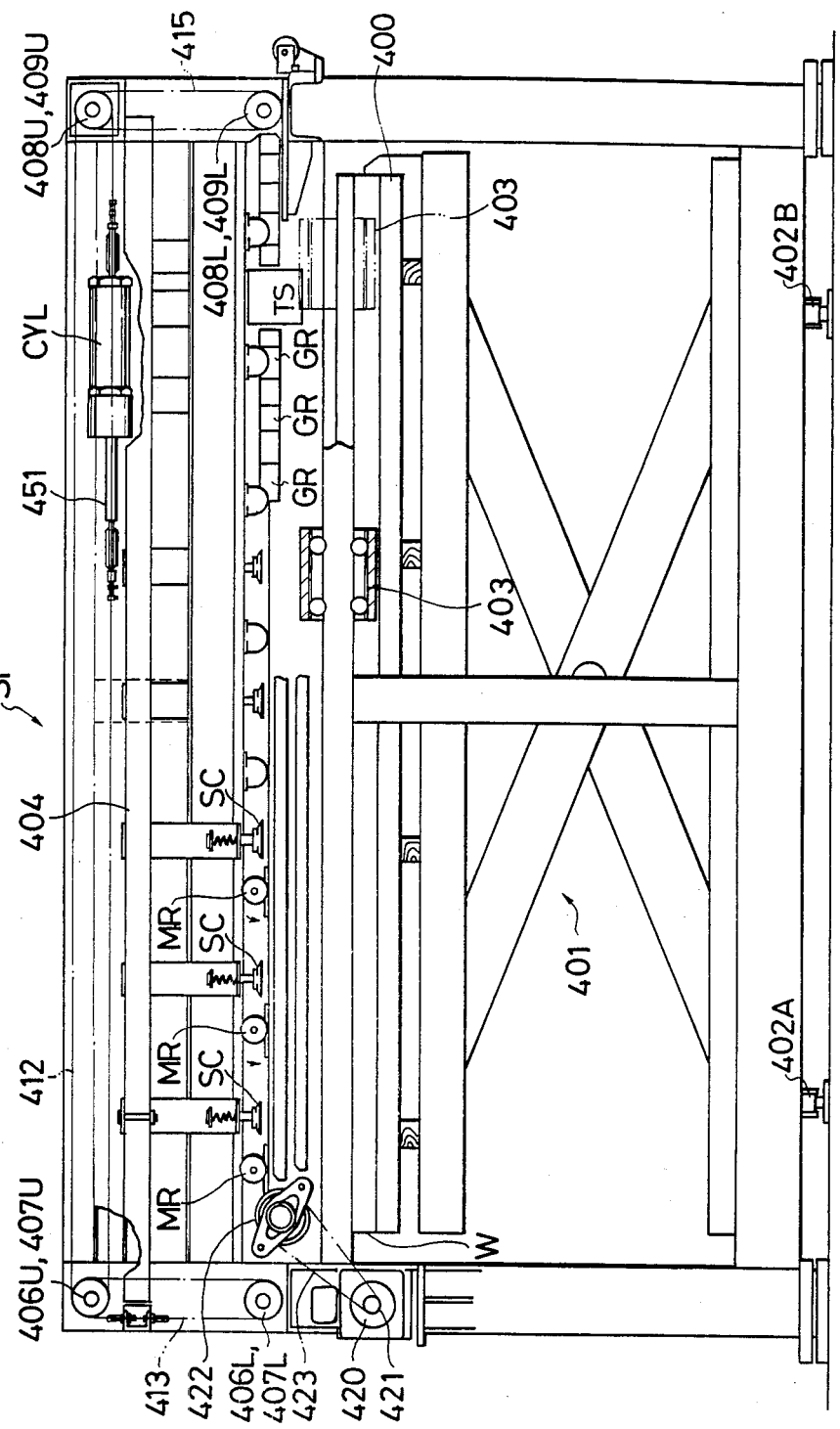

PLATE WORKPIECE PROCESSING MACHINE

BACKGROUND OF THE INVENTION

1. Field of the Invention

The present invention relates generally to a plate workpiece processing machine such as a shearing machine, and more specifically to a workpiece processing machine which can process a workpiece in high precision and at high speed.

2. Description of the Prior Art

In a shearing machine, for instance, before a long plate workpiece is cut off into a plurality of plates of a predetermined length, the workpiece is first trimmed at an extreme forward end thereof. In doing this, conventionally, a workpiece is pushed against a workpiece side surface positioning device so that the side edge thereof is brought into contact with a sidegage (side locating member) arranged on a lower frame in front of a cutter position; and then the workpiece is fed forward until being brought into contact with a trimming stopper member arranged at the back of the cutter position. After having confirmed that the workpiece is correctly positioned by the sidegage and the stopper member, a slide which supports an upper blade is moved downward to trim the workpiece.

In the prior-art method of trimming a workpiece, however, there exists a problem in that it takes much time to trim the workpiece at a correct position and further it is difficult to trim the workpiece accurately because the workpiece is easily dislocated from the sidegage or the trimming stopper member when or after the workpiece is fed forward.

After a workpiece has been trimmed, the trimmed workpiece is to be cut-off into a predetermined length. In the conventional method, a length of the workpiece to be fed forward extending from a cutter position is calculated on the basis of a workpiece position and the current workpiece feeding speed obtained through a servomotor. However, this method is inevitably complicated and costly and therefore requires sufficient maintenance.

SUMMARY OF THE INVENTION

With these problems in mind, therefore, it is the primary object of the present invention to provide a plate workpiece processing machine which can trim and process a workpiece into a predetermined length with a higher precision at a higher speed.

Another object of the present invention is to provide a workpiece side surface positioning device which can accurately feed a workpiece without being subjected to workpiece dislocation from the sidegage.

Still another object of the present invention is to provide a workpiece trimming device which can locate a workpiece at a trimming position and automatically trim the located workpiece at high speed with high precision.

The other object of the present invention is to provide a workpiece forward end positioning device which can locate a workpiece at a predetermined backgage position without applying shock to the backgage, even if the length of a workpiece to be processed changes.

To achieve the above-mentioned object, a plate workpiece processing machine having at least processing tool, according to the present invention comprises: (a) means for positioning a workpiece side surface in magnetic relatable contact engagement with a side surface of a plate workpiece to be fed; (b) means for trimming on extreme forward end of the workpiece in such a way that the workpiece trimming tool is actuated before the workpiece is located at a trimming position to automatically and sequentially trimming a workpiece end; and (c) means for positioning a forward end of the fed workpiece in such a way that a workpiece feed speed is decelerated, before the workpiece is brought into contact with a stop surface thereof, adjustably according to length of the workpiece to be processed, so that workpiece feed speed is reduced substantially to zero when the workpiece is brought into contact with the stop surface.

Further, it is preferable that the machine according to the present invention comprises means for separating a plate workpiece upward from a number of stacked plate workpieces and feeding the separated plate workpiece in the forward direction after the upward movement of the separated plate workpiece has been momentarily stopped perfectly.

In the machine of the present invention, a workpiece is correctly fed forward being magnetically supported by magnet rollers; the fed workpiece is automatically located at a trim position and then trimmed immediately; the trimmed workpiece is next positioned at a predetermined location without applying a shock to a backgage (stopper) before being processed.

BRIEF DESCRIPTION OF THE DRAWINGS

The features and advantages of the plate workpiece processing machine according to the present invention will be more clearly appreciated from the following description taken in conjunction with the accompanying drawings in which like reference numerals and symbols designate the same or similar elements or sections throughout the figures thereof and in which:

FIG. 2 is a top view showing a side surface positioning device SPD and a trimming device TD in combination incorporated in the machine of the present invention;

FIG. 3C is a bottom view showing the same trimming device;

FIG. 8 is a diagrammatical side view showing a workpiece separating/feeding machine, preferably usable with the machine of the present invention;

DETAILED DESCRIPTION OF THE PREFERRED EMBODIMENTS

A shearing machine to which the present invention is applied will be first described by way of example of plate workpiece processing machines.

Figure 1:
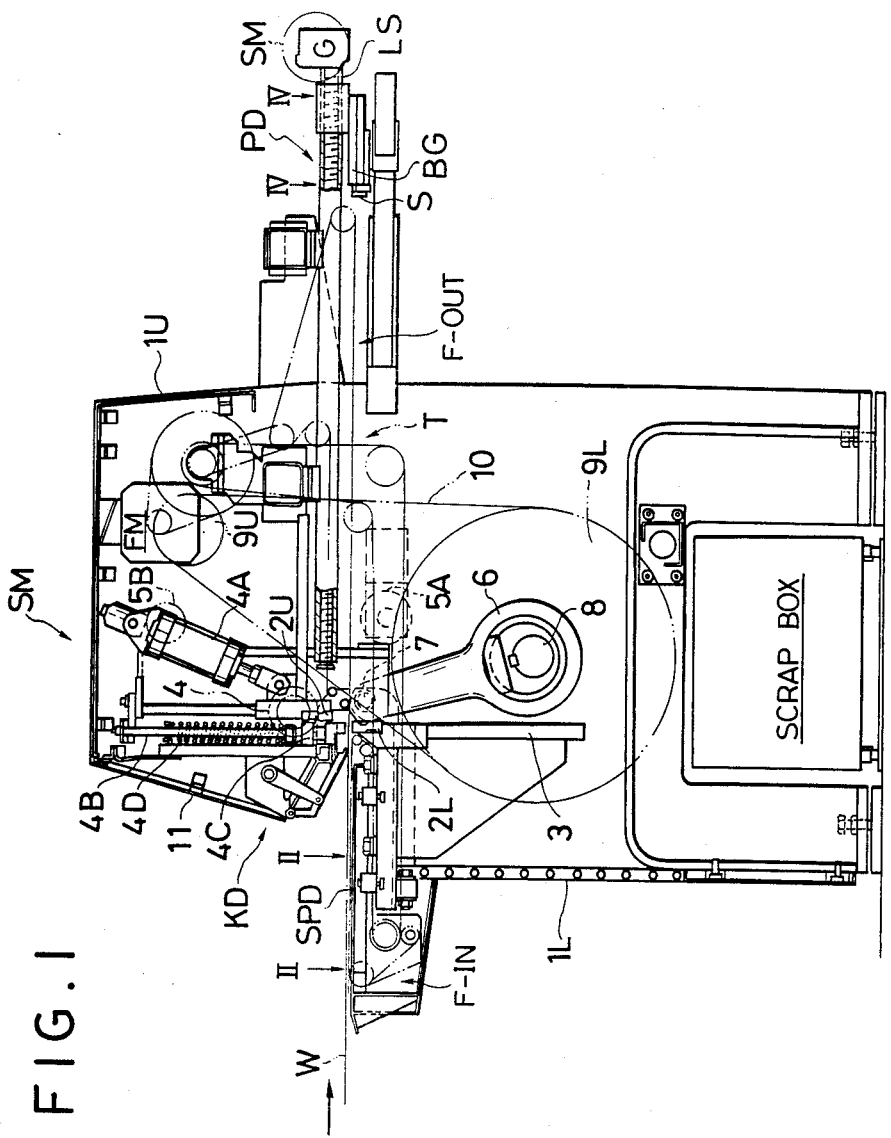
FIG. 1 is a diagrammatical side view, partly in cross section showing a typical shearing machine by way of example of plate workpiece processing machines.

FIG. 1 shows a typical shearing machine SM. The machine SM includes a lower frame 1L and an upper frame 1U. A fixed lower blade 2L is fixed to a blade support member 3 mounted on the lower frame 1L. An movable upper blade 2U is fixed to a slide 4 movable up and down being guided by two guide rollers 5A and 5B. This slide 4 can be moved by a connecting rod 6 having a first end connected to the lower end of the slide 4 via a pin 7 and a second end eccentrically connected to a shaft 8 of a lower pulley 9L. This lower pulley 9L is linked to an upper pulley 9U via a belt 10. The upper pulley 9U is driven by a drive motor (not shown). Therefore, when the drive motor rotates, the connecting rod 6 is rotated eccentrically moving up and down by the aid of the pulleys 9L and 9U and the belt 10, so that the upper blade 2U is moved up and down toward and away from the fixed lower blade 2L to shear a plate workpiece W. To balance the movable slide 4, a balancing cylinder 4A is provided in such a way that the lower end thereof is located at the lower portion of the slide 4, and the upper end thereof is located at the upper portion of the slide 4.

In front (left side) of the slide 4, a vertical rod 4B is disposed integral with the slide 4 and a workpiece press member 4C is vertically slidably supported by the rod 4B. A coil spring 4D is disposed between the rod 4B and the press member 4C to urge the press member 4C upward along the rod 4B. Therefore, when the slide 4 is moved up and down, before a workpiece W is sheared off by the two lower and upper blades 2L and 2U, the workpiece press member 4C slidably attached to the slide 4 via the rod 4B pushes the workpiece W downward to firmly push the workpiece W to the lower frame 1L.

In front of the upper frame 1U, a kick-out device KD for removing scrap material is arranged under a front cover 11. Therefore, when the workpiece is cut off into the last plate of a predetermined length, the remnant can be kicked away into a scrap box disposed within the lower frame 1L by actuating this kick-out device KD.

A workpiece take-in feeder F-IN is arranged in front of the cut-off position (left side in FIG. 1) at which two blades 2L and 2U are disposed, and a workpiece take-out feeder F-OUT is arranged behind the cut-off position (right side in FIG. 1). These two take-in and take-out feeders F-IN and F-OUT are driven by a feeder motor FM through a power transmission device T made up of a number of pulleys and belts as shown by phantom lines in FIG. 1. These feeders are of electromagnetic belt conveyer type.

At the rearmost end of the machine, a workpiece forward end positioning device PD is provided so as to be movable in the workpiece feed direction (right and left in FIG. 1). When a forward end of a workpiece W is brought into contact with a stop surface S of a backgage plate BG, a workpiece can be positioned or located at an appropriate position along the workpiece feed direction before shearing. Further, on the rightmost end of FIG. 1, the symbol SM denotes a servomotor for moving the backgage BG via a gear transmission G and a lead screw LS.

In the shearing machine SM as shown in FIG. 1, the gist of the present invention is to accurately shear a workpiece at a high speed. To achieve the above-mentioned gist, the shearing machine is essentially provided with a novel workpiece side surface positioning device SPD, a novel workpiece trimming device TD, and a novel workpiece forward end positioning device PD.

Figure 3A:
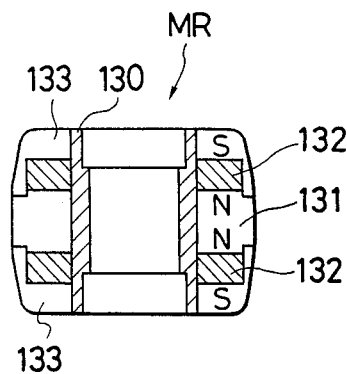
FIG. 3A is a cross-sectional view showing a magnet roller incorporated in the timing device shown in FIG. 2.
Figure 3B:
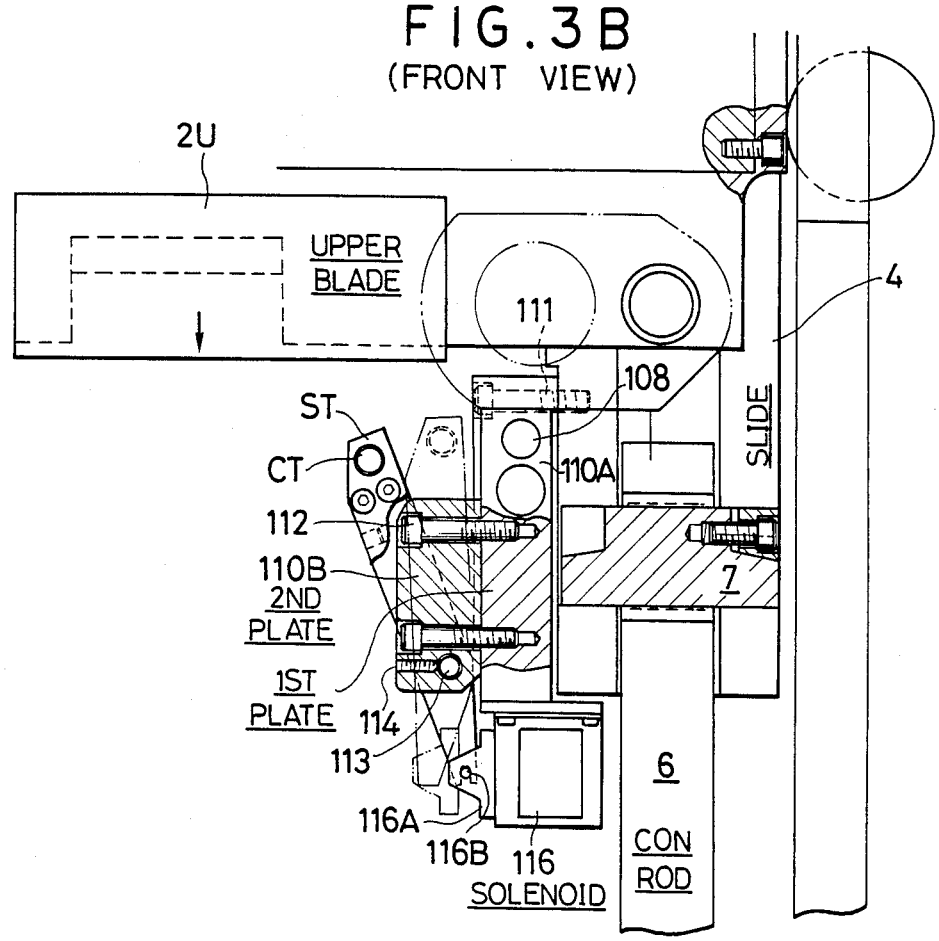
FIG. 3B is a front view showing the same trimming device.

FIG. 2 is an enlarged top view showing the side surface positioning device SPD and the trimming device TD in combination. FIG. 3A is an enlarged cross-sectioned view showing a magnet roller attached to the side surface positioning device SPD. FIG. 3B is an enlarged front view showing the trimming device TD; and FIG. 3C is an enlarged bottom view showing the same device TD.

The feature of this novel side surface positioning device SPD is to provide magnet rollers for rotatably feeding a workpiece under the condition that the workpiece is magnetically supported by the magnet rollers. Further, the feature of this trimming device TD is to start actuating the upper blade a little before the workpiece is brought into contact with a stop surface of the trimming device TD, to automatically and sequentially trim a workpiece after the workpiece has been located to a correct trimming position.

In FIG. 2A, the workpiece side surface positioning device SPD is arranged in front of the cut-out (blade) position fixed under the slide 4. A support member 100 extending in the workpiece feed direction is fixed to the lower frame 1L with bolts. Under this support plate 100, a plurality of magnet rollers MR are arranged at regular intervals.

A plate workpiece W to be fed from the left side in FIG. 2 by the take-in feeder F-IN is pushed against the magnet rollers MR, so that the side surface of the workpiece W is correctly located magnetically when the side edge thereof is brought into contact with the magnet rollers MR. A workpiece W magnetically supported by the magnet rollers MR is fed in the feed direction by the take-in feeder F-IN in magnetic rotatably slidable contact engagement therewith.

FIG. 3A shows a magnet roller MR rotatably attached to the support frame 100 for magnetically contact-feeding a workpiece W. The magnet roller MR comprises a non-magnetic hollow shaft 130, an iron core ring 131 wound around the hollow shaft 130 at the middle portion thereof, a pair of annular permanent magnets 132 arranged so as to sandwich the ion core ring 131, and a pair of non-magnetic covers 133. Further, the non-magnetic hollow shaft 130 is mounted on a shaft (fixed to the support member 100) via a bearing so as to be rotatable while magnetically holding a side surface of a workpiece W fed forward by the workpiece take-in feeder F-IN. Since the above-mentioned magnet rollers are arranged at regular intervals along the longitudinal direction of the support member 100, it is possible to prevent a workpiece W from being dislocated from a correct side surface position.

With reference to FIG. 2 again, on the lower frame 1L, the trimming device TD is provided, which is roughly made up of a trimming position adjust device AD and a workpiece trim end positioning device TEPD. The trim end positioning device TEPD is fixed to the slide 4 via some support members 101 fixed to the upper frame 1U. The adjust device AD is fixed to the lower frame 1L via some mounting members 102. The two devices AD and TEPD are linked through a flexible cable 103. The adjust device AD includes a handle 104, a grip 105, a drive shaft 106, and an indicator 107. Thread is formed on the outer periphery of the drive shaft 106, and an indicator nut is geared with the drive shaft 106. Therefore, when the shaft 106 rotates, the indicator nut is moved to and fro to move the indicator 107 to display a trimming position.

One end (right side in FIG. 2) of the flexible cable 103 is connected to a shaft 108 of the trim end positioning device TEPD. Thread is formed on the outer periphery of the shaft 108. This shaft 108 is supported by the support member 101.

As shown in FIGS. 3B and 3C in more detail, first plate 110A is fixed to the slide 4 with bolts 111. Female thread is formed in this first plate 110A so as to be engageable with the male thread of the shaft 108. A second plate 110B is fixed to the first plate 110A with bolts 112. A stopper member ST is pivotally supported by a shaft 113 fixed by a pin 114 (FIG. 3C) fixed to the second plate 110B. Here, it should be noted that the second plate 110B is fitted to a cutout 115 formed in the stopper member ST as depicted in FIG. 3C. A solenoide 116 is disposed under the first plate 110A to pivotally move the stopper ST upward about the shaft 113 for moving away the stopper ST from a workpiece corner into out-of-contact therewith (see FIG. 2).

In more tail, the solenoide 116 is provided with a plunger 116A. This plunger 116A is engaged with a cutout formed at the lowermost end of the stopper member ST via a pin 116B. Therefore, when the solenoid 116 is energized, the stopper ST is pivoted about the shaft 113 as shown by the solid lines in FIG. 3B, at which a contactor CT is contactable with the fed workpiece W, thus the workpiece trimming device TD being enabled. On the other hand, when the solenoid 116 is deenergized, the stopper ST is pivoted about the shaft 113 by a spring (not shown) as shown by the dot-dot-dashed lines in FIG. 3B, at which the contactor CT is not contactable with the workpiece W, thus the workpiece trimming device TD being disabled.

Near the free end of the stopper member ST, there are formed a throughhole 117 and two cutouts 118A and 118B in FIG. 3C. A shaft 120 having the contactor CT at one end thereof is loosely passed through the throughhole 117. A spring 121 is disposed in the cutout 118A (the left side in FIG. 3C) to urge the contactor CT toward the left, and an insulating member (nylon member) 122 is fitted to the shaft 120. Further, a switch SW is disposed between the nylon member 122 and a dish spring 123 fitted to the shaft 120. When this switch SW is turned on, a drive unit for moving the slide 4 downward is activated to trim a positioned workpiece.

The operation of this trimming device TD will be described hereinbelow.

By rotating the handle 104, the trimming position is first set. When the handle 104 rotates, the flexible shaft 103 rotates the shaft 108, so that the first support frame 110A, the second support frame 110B and the stopper member ST are moved to and fro all together relative to the upper frame 1U to determine a trimming position.

Thereafter, a workpiece W is fed by the take-in feeder F-IN being magnetically held by the magnetic rollers MR, so that an rightmost end edge of the workpiece W is brought into contact with the contactor CT is slidably fitted to the free end of the stopper member ST, so that the dish spring 123 is moved away from the switch SW and therefore the switch SW is turned on. Since this switch SW is connected to a control unit (not shown), a cut-off command signal is generated from the control unit to actuate the slide 4 to cut off the positioned workpiece for trimming. Immediately after the switch SW has been turned on, the workpiece W pushed the contactor CT into the cut-out 118A formed in the stopper member ST and therefore is brought into contact with the end surface of the stopper member ST, so that the trimming position of the workpiece is determined. Although there exists a time lag from when the switch SW is turned on to when the upper blade 2U cuts off the workpiece W, the timing is so determined that the upper blade 2U is moved down for trimming immediately after the workpiece W has been brought into contact with the stopper member ST.

After trimming, the contactor CT returns to its original position by the spring 121 and the switch SW is turned off, so that the dish spring 123 is brought into contact with the switch SW again.

After trimming, the solenoid 116 is deenergized to disable the trimming device TD. That is, the stopper member ST including the contactor CT is pivoted clockwise by a spring (not shown), as shown by the dot-dot-dashed lines in FIG. 3B, being moved away from the high level of the workpiece to be fed.

As described above, in the trimming device TD according to the present invention, since the workpiece positioning and trimming operation can be effected automatically in sequence, while the workpiece W is fed along the magnet rollers being kept at a correct position, it is possible to trim a workpiece accurately at high speed, before starting shearing operation of a workpiece W.

The feature of the novel workpiece forward end positioning device PD is to generate a workpiece feed speed deceleration signal before a workpiece is brought into contact with a stop surface (backgage) of a workpiece end positioning device and further to adjust this deceleration signal generation point according to the length of the workpiece to be cut. Therefore, it is possible to accurately position or locate a workpiece at a predetermined position without shock.

Figure 4:
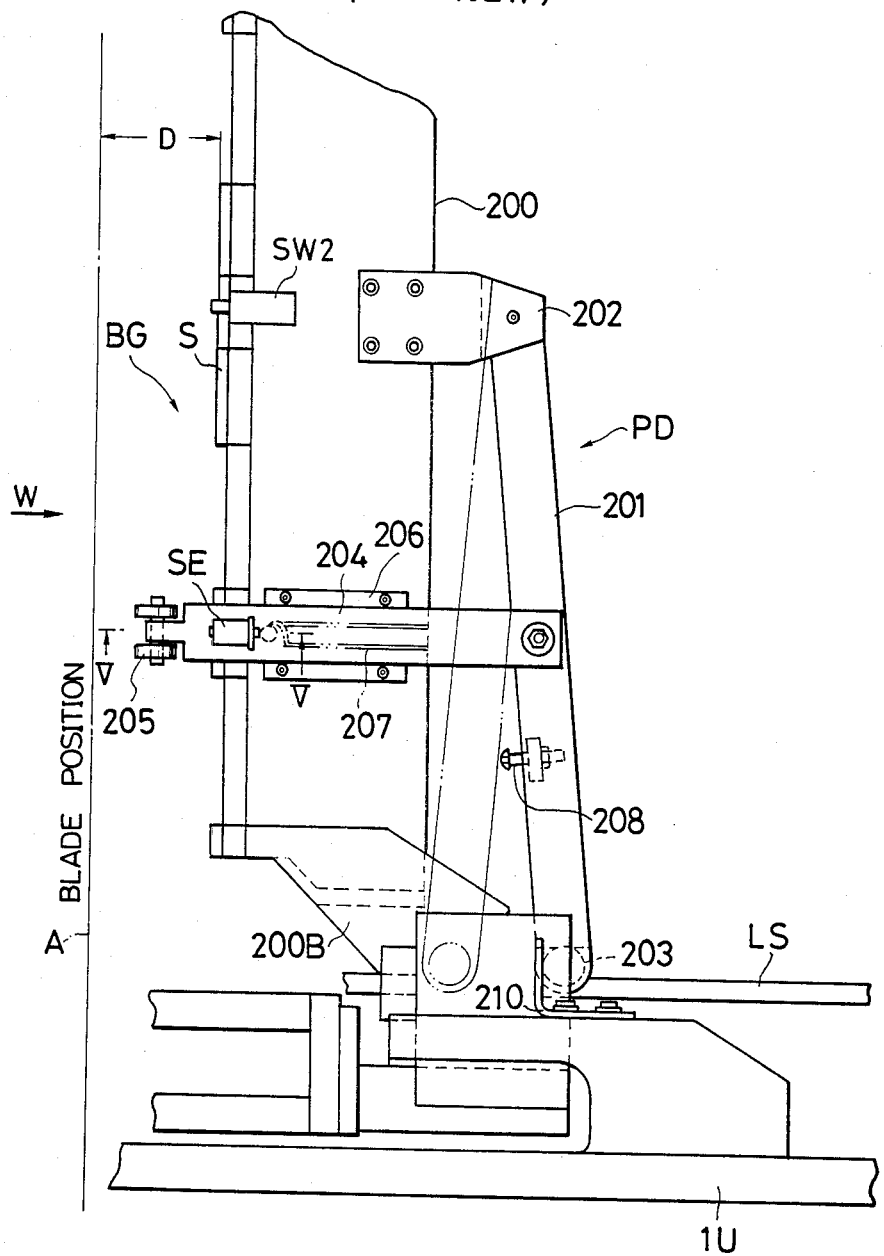
FIG. 4 is a top view showing a workpiece end positioning device incorporated in the machine of the present invention.

FIG. 4 is an enlarged top view showing the workpiece forward end positioning device PD. The structural feature of this device is to provide a link mechanism including a workpiece sensor. The device PD comprises a backgage body 200 having a stop surface S at which a workpiece W is stopped before sheared off into a predetermined length, a pivotal arm member 201 having an end pivotally supported by a bracket 202 fixed to the backgage body 200 and a free end to which a roller 203 is rotatably supported, and a sensor rod 204 having an end pivotally supported at the middle of the arm member 201 and a free end to which a pair of guide rollers 205 are rotatably supported.

Figure 5:
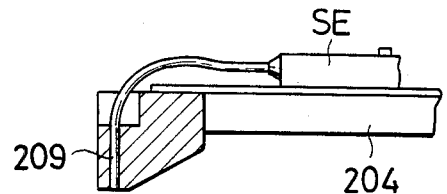
FIG. 5 is a side view showing a workpiece sensor used for the same end positioning device.

As shown in FIGS. 4 and 5, an optical workpiece sensor SE is mounted on the sensor rod 204, and an optical fiber 209 is passed downward through a hole formed at the free end of the rod 204. When the workpiece W comes under this fiber 209, the optical sensor SE can detect the presence of the workpiece W because a light beam emitted from the sensor SE is reflected from the workpiece and then received by the sensor again.

This sensor rod 204 is slidably supported by a support base 206 fixed to the backgage body 200 and urged by a spring 207 toward the left in FIG. 4. Further, an adjust screw 208 is attached to the arm 201 so as to be brought into contact with the backgage body 200. Therefore, it is possible to adjust the sensor position by rotating this adjust screw 208.

The backgage body 200 are provide with two bracket 200B on both the ends thereof. Each bracket 200 is formed with female thread. A pair of backgage lead screws LS are disposed on both the sides of the upper frame 1U. This lead screws LS is rotated by a servomotor SM via a reduction gear G (both shown in FIG. 1). Therefore, when the servometer SM is driven, the positioning device PD moves to and fro along the workpiece feed direction for adjustment.

A link stopper 210 (FIG. 4) is fixed on the side surface of the upper frame 1U at such a position that the distance D between the blade position A and the stop surface S of the backgage body 200 becomes a predetermined small value (e.g. 100 mm or less). That is, when a length of a workpiece to be cut off is short and therefore the positioning device PD is set near the blade position A, the link stopper 210 pivotes the arm 201 counterclockwise to reduce the distance between the sensor SE (the fiber end position) and the stop surface S, in order that the workpiece feed speed deceleration signal can adjustably be generated before the workpiece is brought into contact with the stop surface S.

The operation of this positioning device PD will be described hereinbelow.

In determining a length of the workpiece W, the position device PD is moved to and fro by driving the servomotor SM. Since the lead screw LS is rotated, the backgage body 200 is moved to and fro.

In this case, if the length to be cut is 100 mm or more, for instance, the roller member 203 rotatably supported at the free end of the arm 201 will not be brought into contact with the link stopper 210, so that the arm 201 is urged toward the left by the spring 207. Therefore, the distance B between the optical fiber 209 (disposed at the top free end of the sensor rod 204) and the stop surface S of backgage body 200 becomes the maximum.

Figure 6A:
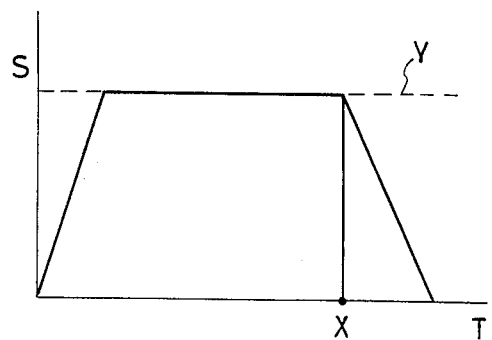
FIG. 6A is a workpiece feed speed diagram obtained when a workpiece is cut off into a relatively long length.

After the backgage body 200 has been set, the workpiece feeder moves the workpiece W toward the backgage body 200. When the workpiece end is detected by the optical sensor SE, the feeder motor FM is switch into a deceleration mode at time point X as depicted in FIG. 6A, so that the feeder motor speed Y drops sharply. Further, when the workpiece end is brought into contact with the stop surface S of the backgage 200, a switch SW2 (FIG. 4) attached at the stop surface position is turned off to stop the feeder motor FM and simultaneously activate the drive motor to cut off the positioned workpiece.

On the other hand, if a workpiece length to be cut is 100 mm or less, the roller member 203 attached to the free end of the arm will be brought into contact with the link stopper 210, so that the arm 201 is urged toward the right. Therefore, the distance B is reduced according to the workpiece length to be cut.

Figure 6B:
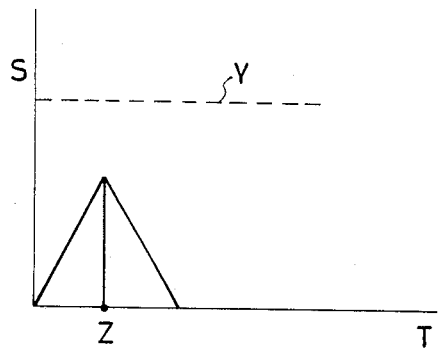
FIG. 6B is a similar workpiece feed speed diagram obtained when a workpiece is cut off into a relatively short length.

After the backgage body 200 has been set, the workpiece feeder moves the workpiece W toward the backgage body 200. When the workpiece end is detected by the optical sensor SE, the feeder motor FM is switched into a deceleration mode at time point Z as depicted in FIG. 6B, so that the feeder motor speed Y drops sharply before reaching the maximum speed Y. Further, when the workpiece is brought into contact with the stop surface S of the backgage 200, similarly the switch SW2 is turned off to stop the feeder motor FM and simultaneously activate the drive motor to cut off the positioned workpiece.

In summary, since the deceleration point is adjusted according to the workpiece length, it is possible to always reduce the workpiece feed speed down to zero near the stop surface S of the backgage, even if the workpiece length is short, thus improving the accuracy of the workpiece positioning and eliminate a shock applied to the positioned workpiece W by the backgage body 200.

In the shearing machine of the present invention, a pair of novel upper and lower blades are incorporated as described later.

Figure 7:
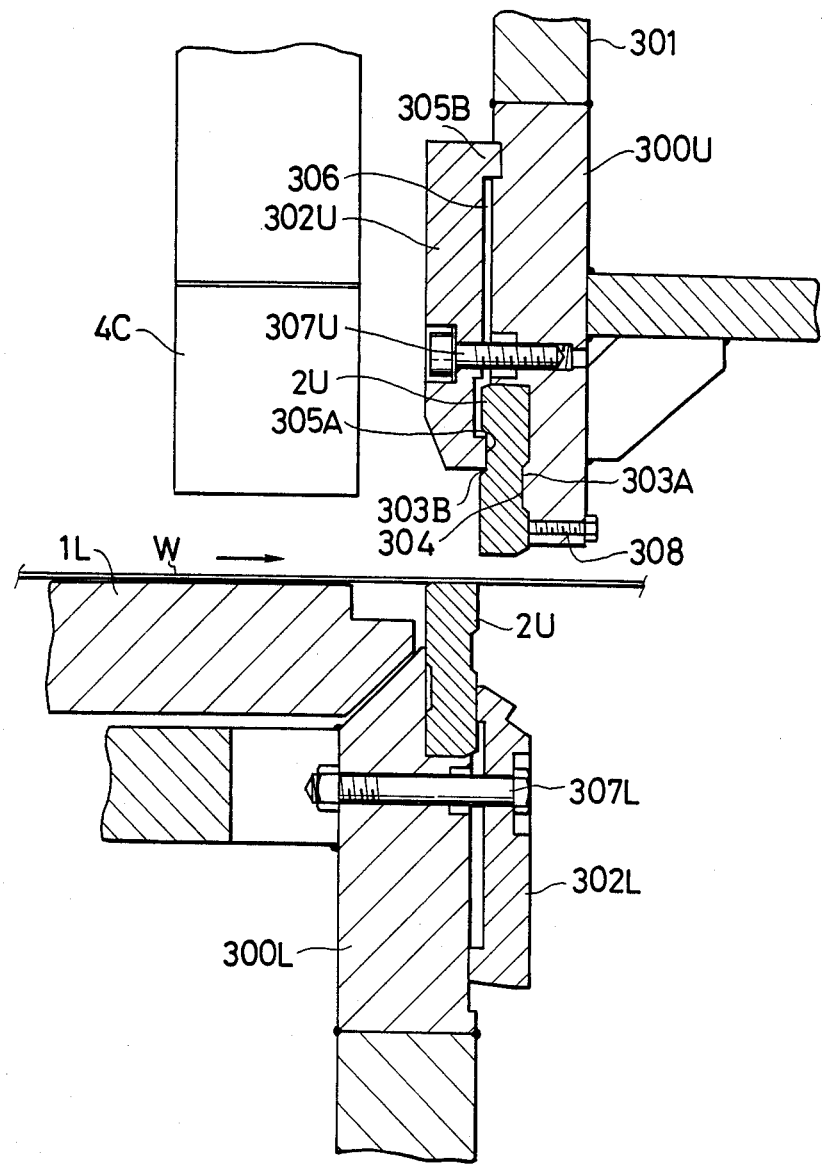
FIG. 7 is an enlarged cross-sectional view showing upper and lower blades incorporated in the machine of the present invention.

In FIG. 7, the upper blade 2U is fixed between an upper blade holder 300U fixed to a ram 301 and an blade clamp 302U. The upper blade 2U is formed with a two engagement recesses 303A and 303B on both the sides thereof, respectively. The recess 303A is engaged with a projecting surface 304 and the recess 303B is engaged with a first end projecting surface 305A of the blade clamp 302U. A second end projecting surface 305B of the blade clamp 302U is engaged with a recess formed in the blade holder 300U. Therefore, a gap 306 is formed between the blade clamp 302U and the blade holder 300U or the blade 2U. The upper blade 2U is clamped between the clamp 302U and the holder 300U with bolts 307U. Further, adjust belts 308 are disposed near the lower end of the holder 300U. By use of the adjust bolts 308, it is possible to adjust a clearance between the two upper and lower blades 2U and 2L.

The lower blade 2L is the same in cross section as the upper blade 2U in shape, and fixed between the lower blade holder 300L and the lower blade clamp 302L in the same way, Two diagonally opposed edges in cross section are chamfered, so that the upper blade 2U can be used as the lower blade 2L when turned inside out and upside down. The lower blade clamp 302L is substantially the same as the upper blade clamp 302U in cross section. However, the lower blade 2L can be set on the lower blade holder 300L, without engaging the recesses formed in the blade 2U with the projecting surfaces of the blade clamp 307U, because the lower blade 2L will not be dropped easily as in the upper blade 2U.

The blade can be exchanged as follows: In the case of the upper blade 2U, the bolts 307 are unfastened a few turns to open the lower end of the clamp 302U, so that the engagements with two recesses 303A and 303B are released. Therefore, the upper blade 2U is removable downward. Thereafter, a new upper blade is replaced with the old one or the old blade is turned inside out and upside down before remounting the old one. The blade mounted between the clamp 302U and the holder 300U is clamped by fastening the bolts 307 firmly.

In the case of the lower blade 2L, since the blade 2L is not dropped, when the bolts 307L are unfastened only a single turn, it is possible to more easily remove or exchange the lower blade 2L.

In the blade clamping device according to the present invention, it is unnecessary to perfectly remove the bolts which fasten the blade. Further, since the recesses are formed on both the sides of the blade, it is possible to prevent the blade from being dropped onto the floor. Further, it is unnecessary to use many bolts, therefore, it is possible to reduce mechanical distortion caused by heat treatment. Further, when shearing load is not great, it may be possible to clamp the blade with a lever provided with a clamping cam.

The shearing machine according to the present invention have been described. The features thereof serve to shear a workpiece at higher speed under higher precision.

To further improve the processing speed and processing precision, it is preferable to provide a workpiece separating/feeding machine for lifting a plate material one by one from a lifter before feeding it to the shearing machine.

In conventional workpiece separating/feeding machines, the workpiece lifting operation and the workpiece feeding operation have usually been effected continuously without momentarily stop, thus resulting in an unstable lifting operation.

Figure 9A:
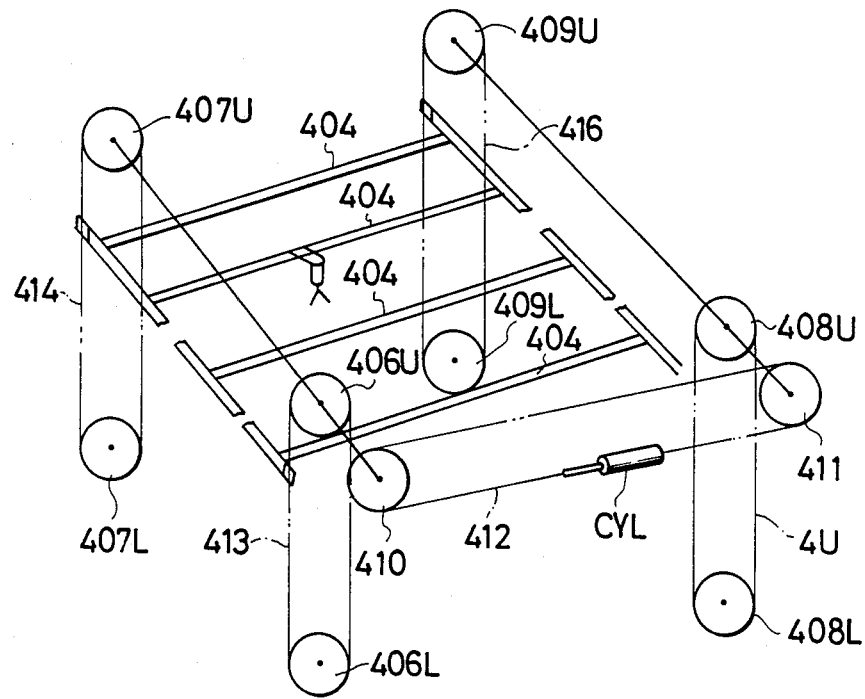
FIG. 9A is a diagrammatical perspective view showing sprocket and chain mechanism for assistance in explaining the operation of the workpiece separating-/feeding machine shown in FIG. 8.

An example of the workpiece separating/feeding machine SF to be incorporated in the shearing machine of the present invention will be explained in more detail with reference to FIGS. 8, 9A and 9B.

In FIG. 8, a pallet 400 is mounted on a lifter 401. A number of thin plate workpieces W are mounted on the pallet 400. The lifter 401 automatically adjusts the height of the upper-most workpiece W at a constant level at all times. The lifter 401 is movable on the floor along a pair of rails 402A and 402B. To mount the workpieces W on the machine SF, workpieces are first mounted on the pallet 400 outside the machine SF; the pallet 400 is mounted on the lifter 401; the pallet 400 is moved under the machine along the rails 402A and 402B. In this case, the lifter position is determined when a side surface of the workpiece W is brought into contact with a stopper member 403. This stopper member 403 is slidable to and fro in FIG. 8 between a first position as shown by dashed lines to a second position as shown by solid lines.

In order to bring a workpiece W mounted on the pallet 400 arranged on the lifter 401 upward to series-arranged magnet rollers MR, a plurality of suction cups SC are disposed as shown. The cups SC are supported by a cup holder member 404. To move the cup holder member 404 up and down, eight sprockets 406U, 406L, 407U, 407L, 408U, 408L, 409U and 409L as shown in FIG. 9A are arranged. Further, two other sprockets 410 and 411 are arranged coaxially with the sprockets 406U, 407U and 408U, 409U, respectively. A three-position stop hydraulic cylinder CYL is connected to a chain 412 reeved around the two sprockets 410 and 411.

Therefore, when the hydraulic cylinder CYL is operated, two sprockets 410 and 411 rotate, and therefore the eight sprockets rotate to move four chains 413, 414, 415 and 416 up and down. Since the cup support frame 404 are fixed to these chains, it is possible to move the suction cups SC up and down.

The suction cups SU are moved down to the workpiece W (a suction position) and then up to the magnet roller (a magnet position).

Once the workpiece is held by the magnet rollers MR, a drive motor 420 is driven, to drive the magnet rollers MR via two sprockets 421 and 422 and a chain 423, so that the magnet rollers MR are rotated counterclockwise to feed the workpiece W toward the right with the outer periphery of the magnet roller in magnetical rotatable contact with the workpiece surface.

To accurately stop the suction cups at three positions of stand-by position, suction position and magnet position, the three-position hydraulic cylinder CYL is constructed as follows: In FIG. 9B, the cylinder CYL is made up of a body 450, a piston rod 451, and a first and second pistons 452A and 452B. The cylinder body 450 forms two piston chambers 453A and 453B. These two piston chambers communicated with each other.

Figure 9B:
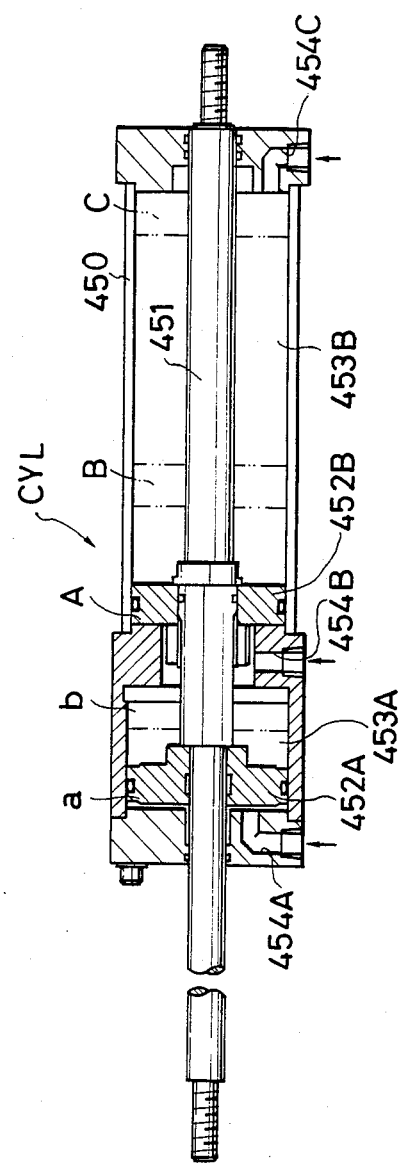
FIG. 9B is a cross-sectional view showing a three-position hydraulic cylinder incorporated in the separating/feeding machine.

FIG. 9B shows the suction position a, A by solid lines. When oil is supplied through passages 454A and 454B, two pistons are moved as shown by dot-dot dashed lines b, B, that is, into the magnet position. Then, if oil is further supplied through the passage 454B, only the piston 452B is moved to the rightmost position also as shown by dot-dot-dashed lines, that is, into the stand-by position C. In this case, the first piston 452A is left at the position b, because the first piston 452A is slidable along the piston rod 451. Further, when oil is supplied from a passage 454C, two pistons 452A and 452B are returned to the original suction position a, A.

Further, in FIG. 8, the symbols GR denote guide rollers; TS denotes a thickness sensor for detecting for whether a single plate is being fed.

What a claimed is:

1. A plate workpiece processing machine having at least one processing tool, comprising:
    (a) means (SPD) for positioning a workpiece side surface in magnetic rotatable contact engagement with a side surface of a plate workpiece to be fed;
    (b) means (TD) for trimming on extreme forward end of the workpiece in such a way that the processing tool is actuated before the workpiece is located at a trimming position to automatically and sequentially trimming a workpiece end; and
    (c) means (PD) for positioning a forward end of the fed workpiece in such a way that a workpiece feed speed is decelerated, before the workpiece is brought into contact with a stop surface thereof, adjustably according to length of the workpiece to be processed, so that workpiece feed speed is reduced substantially to zero when the workpiece is brought into contact with the stop surface.

2. The plate workpiece processing machine as set forth in claim 1, which further comprises means for separating a plate workpiece upward from a number of stacked plate workpieces and feeding the separated plate workpiece in the forward direction after the upward movement of the separated plate workpiece has been momentarily stopped perfectly.

3. The plate workpiece processing machine as set forth in claim 1, wherein said workpiece side surface positioning means (SPD) comprises:
    (a) a support plate member (100) extending in a workpiece feed direction; and
    (b) a plurality of magnet rollers (MR) arranged along a longitudinal direction of said support plate member, for magnetically attracting a side surface of the workpiece and feeding the workpieces by rotation when the workpiece is being fed forward.

4. The plate workpiece processing machine as set forth in claim 3, wherein said magnet roller (MR) comprises:
    (a) a nonmagnetic hollow shaft (130);
    (b) an iron core (131) wound around said hollow shaft (130);
    (c) two annular permanent magnets (132) fitted to said hollow shaft with said iron core sandwiched therebetween.

5. The plate workpiece processing machine as set forth in claim 1, wherein said workpiece trimming device (TD) comprises:

(a) a pivotal stopper member (ST) having a workpiece stop surface;

(b) a contactor member (CT) slidably fitted to a first free end of said pivotal stopper member, said contactor member being urged by a spring so as to project from the workpiece stop surface of said pivotal stopper member;

(c) a switch (SW) intervening between said pivotal stopper member and said contactor member, said switch being turned on when a workpiece is brought into contact with said contactor member to generate a workpiece trimming signal, before the workpiece is brought into contact with the workpiece stop surface of said pivotal stopper member for workpiece positioning, in order to process the workpiece immediately after the workpiece has been positioned; and (d) a solenoid (SL) connected to a second free end of said pivotal stopper member, for pivoting said pivotal stopper member into a trimming position when energized and out of the trimming position when deenergized or vice versa.

6. The plate workpiece processing machine as set forth in claim 5, wherein said workpiece trimming device (TD) further comprises:

(a) a handle (104);

(b) a flexible cable (103) connected to said handle;

(c) a trimming device support member (110A) on which said pivotal stopper member (ST) and said solenoid (SL) are mounted, said support member being adjustably moved to and fro when said flexible cable is rotated through thread engagement between a male thread formed in said flexible cable and a female thread formed in said support member.

7. The plate workpiece processing machine as set forth in claim 1, wherein said workpiece forward end positioning means (PD) comprises:

(a) a backgage stopper member (200) having a workpiece locating surface (S) and slidable in a workpiece feed direction;

(b) an arm member (201) having a pivotal end pivotally supported by said backgage stopper member and a free end to which a roller (203) is rotatably supported.

(c) a sensor rod (204) slidably supported by said stopper member, said sensor rod having a first end pivotally connected to near middle of said arm and a second end projecting from the workpiece locating surface (S) by a spring;

(d) a workpiece sensor (SE) mounted on said sensor rod, for detecting a presence of a workpiece located at the second end of said sensor rod to generate a workpiece feeding speed decelerating signal before the workpiece is brought into contact with the workpiece locating surface; and (e) a stopper means (210) located near a processing position and contactable with the roller (203) supported by said arm member to reduce a distance (b) between a sensor detection position and the workpiece locating surface, when a length of the workpiece to be processed is below a predetermined length.

8. The plate workpiece processing machine as set forth in claim 2, wherein said a workpiece separating-/feeding machine (SF) comprises:

(a) a lifter (401) for lifting a number of workpieces (W) to a constant height level;

(b) a plurality of magnet rollers (MS) for magnetically holding and feeding a plate workpiece (W) in magnetic rotatable contact engagement with a surface of the workpiece;

(c) a plurality of suction cups (SC) for suction lifting a workpiece arranged on the lifter to the magnet rollers;

(d) a plurality of sprocket and chain mechanism for selectively lifting the suction cups to three positions of a highest stand-by position, an intermediate magnetic roller position, and a lowest suction cup position;

(e) a three-position hydraulic cylinder (CYL) for driving said sprocket and chain mechanism to the three definite positions.

9. The plate workpiece processing machine as set forth in claim 8, wherein said three position hydraulic cylinder (CYL) comprises:

(a) a cylinder body (450);

(b) a piston rod (451) slidably housed within said cylinder body; and (c) first and second pistons (452A, 452B) slidably fitted to said piston rod so as to form a first piston chamber between said cylinder body and said first piston (452A), a second piston chamber between said two pistons (452A, 452B) and a third piston chamber between the second piston and said cylinder body, each of three piston chambers being connected to each hydraulic passage.

10. The plate workpiece processing machine as set forth in claim 1, wherein when said plate workpiece processing machine is a shearing machine, said processing tool is a pair of upper and lower blades formed with at least one recessed surface on either side of each of said blades in such a way that a cross section of the blade is the same in shape when the blade is turned inside out and upside down.

11. A method of processing a plate workpiece, which comprises the following steps of:

(a) feeding a plate workpiece along magnet rollers in magnetic rotatable contact engagement with a side surface of a plate workpiece to be fed;

(b) detecting the presence of the fed workpiece a short distance before a trimming position to generate a trimming signal;

(c) trimming the workpiece in response to the trimming signal at the trimming position;

(d) detecting the presence of the trimmed, fed workpiece a short distance before a backgage position to generate a feed speed deceleration signal, adjustably according to length of the workpiece to be processed, in such a way that workpiece feed speed is reduced substantially to zero when the workpiece reaches the backgage position;

(e) detecting the presence of the workpiece positioned by the backgage; and (f) processing the positioned workpiece.

12. The method as set forth in claim 11, which further comprises:

(a) lifting a signal plate workpiece from a stacked plate workpieces;

(b) stopping the lifting motion of the workpiece;

(c) feeding the lifted workpiece toward a processing position along magnet rollers in magnetic rotatable contact engagement with a flat surface of the workpiece.

* * * * *

UNITED STATES PATENT AND TRADEMARK OFFICE
CERTIFICATE OF CORRECTION

PATENT NO. : 4,829,864
DATED : May 16, 1989
INVENTOR(S) : Masayoshi YANAGISAWA et al It is certified that error appears in the above-identified patent and that said Letters Patent is hereby corrected as shown below:

FRONT PAGE:

Foreign Application Priority Data:

"Japan .......61-91227(U)" should be --Jun. 17, 1986 (JP)

Japan ........61-91227(U)--

"Japan .......61-92404(U)" should be --Jun. 19, 1986 (JP)

Japan ........61-92404(U)--.

IN THE ABSTRACT:

Column 2, line 1, "A process" should be --To process--.

IN THE SPECIFICATION:

Column 5, line 32, "In more tail, the solenoide" should be --In more detail, the solenoid--;

line 68, "so that an" should be --so that a--;

Column 6, line 2, "is slidably" should be --slidably--;

UNITED STATES PATENT AND TRADEMARK OFFICE
CERTIFICATE OF CORRECTION

PATENT NO. : 4,829,864
DATED : May 16, 1989
INVENTOR(S) : Masayoshi YANAGISAWA et al It is certified that error appears in the above-identified patent and that said Letters Patent is hereby corrected as shown below:

IN THE SPECIFICATION:

Column 7, line 24, "pivotes" should be --pivots--;

line 47, "switch" should be --switched--;

Column 8, line 18, "and an blade" should be --and a blade--;

line 19, "with a two" should be --with two--;

Column 9, line 54, "are fixed" should be --is fixed--.

Signed and Sealed this

Twentieth Day of March, 1990

*Attest:*

JEFFREY M. SAMUELS

*Attesting Officer*  *Acting Commissioner of Patents and Trademarks*